(12) United States Patent
Masuda

(10) Patent No.: US 6,442,351 B1
(45) Date of Patent: Aug. 27, 2002

(54) VIEW FINDER

(75) Inventor: Takeshi Masuda, Kanagawa (JP)

(73) Assignee: Fuji Photo Film Co., Ltd., Kanagawa (JP)

( * ) Notice: Subject to any disclaimer, the term of this patent is extended or adjusted under 35 U.S.C. 154(b) by 0 days.

(21) Appl. No.: 09/946,729

(22) Filed: Sep. 6, 2001

(30) Foreign Application Priority Data

Sep. 6, 2000 (JP) ........................................ 2000-270188

(51) Int. Cl.[7] .............................................. G03B 13/06
(52) U.S. Cl. ........................................ 396/382; 396/384
(58) Field of Search ........................................ 396/382

(56) References Cited

U.S. PATENT DOCUMENTS

| | | | |
|---|---|---|---|
| 3,602,085 A | * 8/1971 | Wagner | 396/382 |
| 5,053,803 A | * 10/1991 | Suda et al. | 396/111 |
| 5,475,458 A | * 12/1995 | Arai | 396/386 |
| 5,640,632 A | * 6/1997 | Koyama et al. | 396/382 |
| 5,664,244 A | * 9/1997 | Yamamura et al. | 396/296 |
| 5,774,747 A | * 6/1998 | Ishihara et al. | 396/61 |

FOREIGN PATENT DOCUMENTS

JP            6-301082          10/1994

\* cited by examiner

*Primary Examiner*—Russell Adams
*Assistant Examiner*—Michelle Nguyen
(74) *Attorney, Agent, or Firm*—Young & Thompson

(57) ABSTRACT

An inverse Galilean view finder has an object lens and an eyepiece lens. The front of the object lens is flat surface. First micro corner cube prisms are arranged in a frame of visual field around the external periphery of the flat surface. Second micro corner cube prisms are arranged in a frame on the rear surface of the eyepiece lens. Light from an object is reflected toward the object lens by the second micro corner cube prisms. Reflective light from the second micro corner cube prisms is reflected by the first micro corner cube prisms, and returns to the eyepiece lens. The reflective light of the first micro corner cube prisms brights and it is observed within a finder as a finder field frame indicating a range of photography.

16 Claims, 8 Drawing Sheets

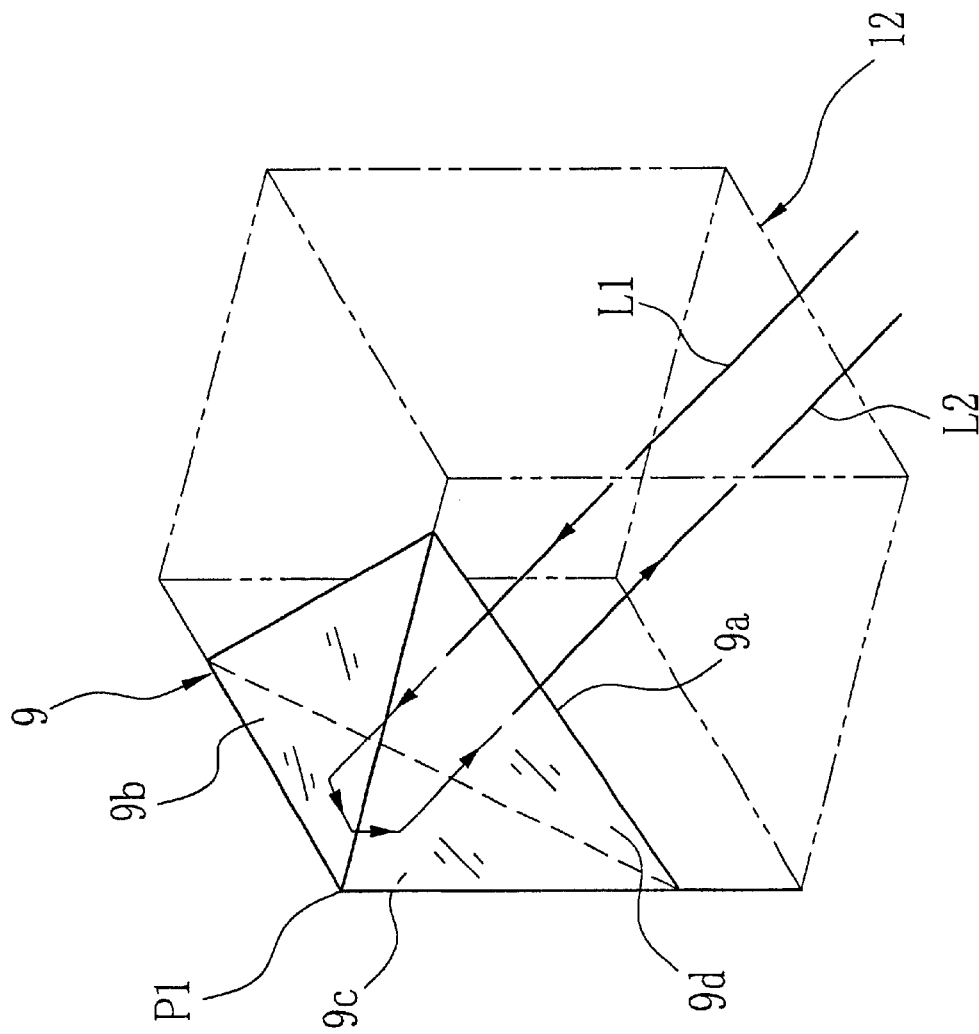

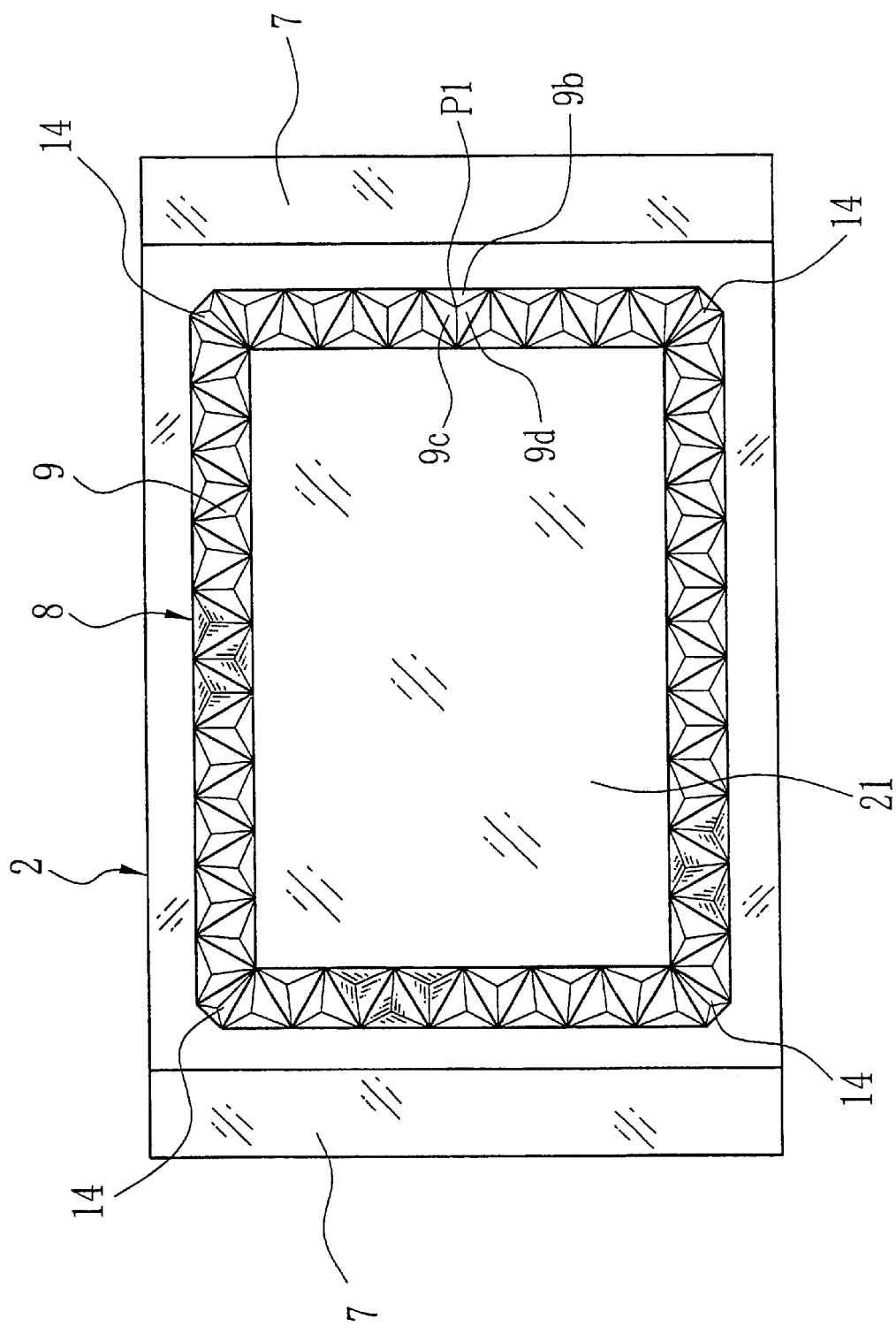

VIEW FINDER

BACKGROUND OF THE INVENTION

1. Field of the Invention

The present invention relates to a view finder that is used in a camera, a lens-fitted photo film unit and the like, more particularly relates to a view finder in which a frame of visual field can be observed.

2. Explanations of the Prior Arts

An Albada-type inverse Galilean view finder (hereinafter it is referred to Albada finder) has been widely used for a compact camera and a lens-fitted photo film unit for its simple structure and low cost. An Albada finder with easiest structure consists of an object lens and an eyepiece lens. The object lens is a concave lens while the eyepiece lens is a convex lens. A quadrilateral frame is formed in the front (object side) of the eyepiece lens. A half-mirror is formed in the rear (image side) of the object lens. The half-mirror of the object lens has two types: one is that the half-mirror is formed on the whole surface of the rear, while the other is formed on a part of the rear. A finder field frame showing the field of photography is displayed in the view finder. The half-mirror on the object lens and the frame line of the eyepiece lens are formed by treating metal a vacuum vapor deposition. Since the vacuum vapor deposition requires highly pure metal and takes a long time. That decreases productivity of the finder lens (object lens and eyepiece lens), resulting in cost increase.

Japanese Laid-open Patent Application No.6-301082discloses a view finder using prisms in place of the half-mirror of the object lens. This view finder has almost triangular pyramid roof-type prisms that are arranged on the periphery of the object lens and prisms of square section that are arranged in a frame on the eyepiece lens. A bright view finder frame forms the prisms is displayed in the view finder.

However, this view finder has a problem. When an eye of a photographer is off from an optical axis, light from one reflective surface gets weakened of two reflective surfaces of the roof-type prisms, because each prism formed on the periphery of the object lens takes the shape of roughly triangular pyramid. As a result, the finder field frame becomes an alternate striped pattern of light parts and dark parts.

SUMMARY OF THE INVENTION

The main object of the present invention is to provide a view finder that does not form a stripe pattern on a finder field frame.

Another object of the present invention is to provide a view finder that is manufactured in a low cost.

To attain the above object and the other object, a view finder of the present invention includes a first reflective portion that is arranged on an eyepiece lens, and a second reflective portion that is arranged on the object lens, the second reflective portion being constituted of corner cube prisms. The corner cube prisms are integrally formed with the object lens. Further, the corner cube prisms can be used as first reflective portion, too.

According to the present invention, it is possible to obtain a bright visual field of view finder since the corner cube prisms that are arranged in a frame are used as a reflective portion of the object lens. And a bright and stable frame of visual field a finder field frame can be displayed because the finder field frame is formed by the self-reflective properties of the corner cube prism. Moreover, the view finder is integrally formed with corner cube prisms, therefore the cost of a finder lens can be manufactured at a low cost.

BRIEF DESCRIPTION OF THE DRAWINGS

The above objects and advantages of the present invention will become apparent from the following detailed description of the preferred embodiments when read in connection with the accompanying drawings:

FIG. 2 is an explanatory view illustrating the action of corner cube prisms;

FIG. 3 is a front elevation of an object lens;

DETAILED DESCRIPTION OF THE PREFERRED EMBODIMENT

Figures 1, 1A:
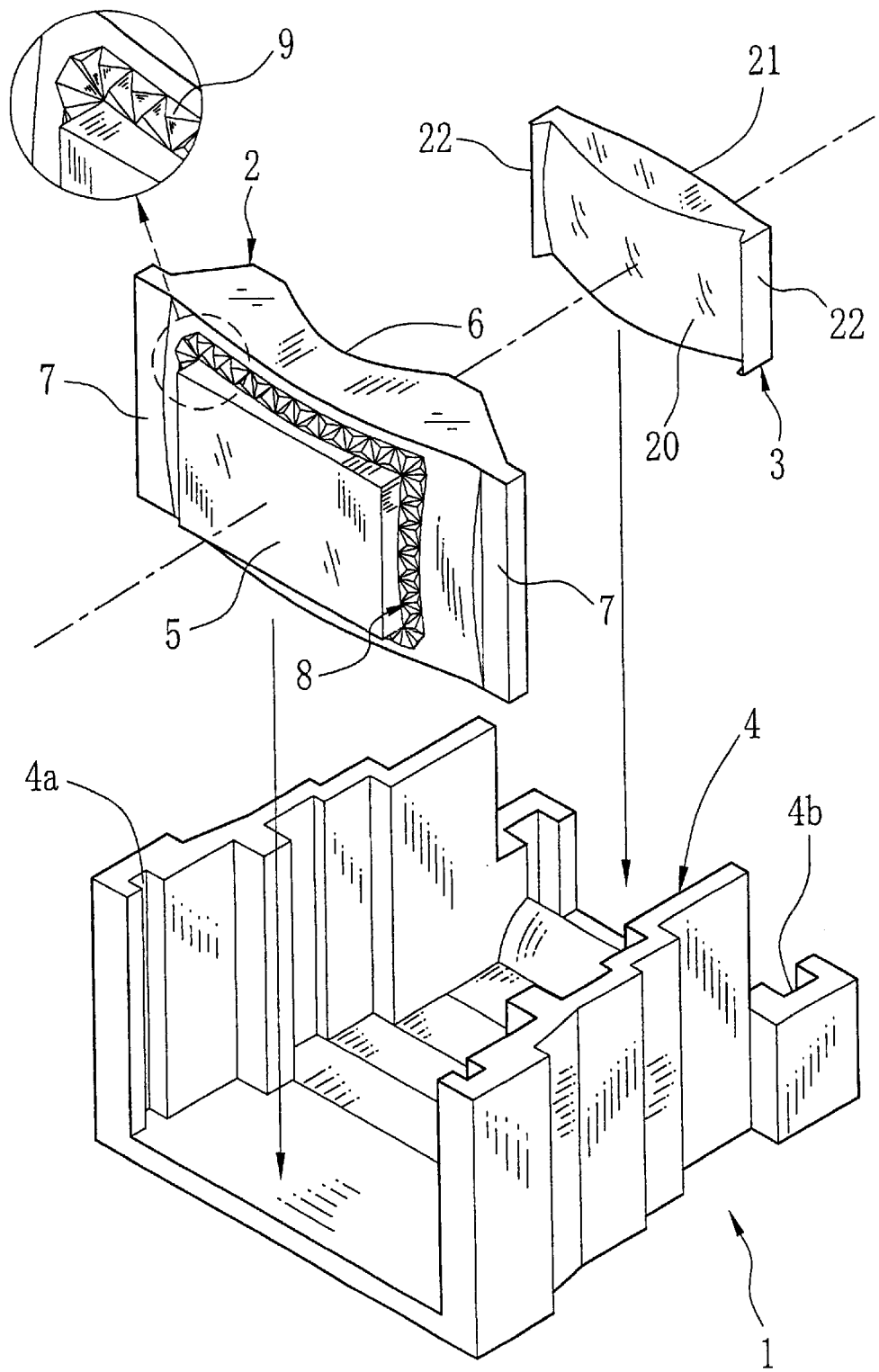
FIG. 1 is an exploded perspective view illustrating a view finder of the present invention and FIG. 1A is a greatly enlarged view of corner cube prisms.

In the FIG.1, an inverse Galilean view finder 1 is constituted of a finder lens system and a lens holder 4. The finder lens system consists of an object lens 2 and an eyepiece lens 3. The object lens 2 is a concave lens while the eyepiece lens 3 is a convex lens. Both the object lens 2 and the eyepiece lens 3 are made from plastics. The object lens 2 is inserted into a groove 4a of the lens holder 4 on one hand, and the eyepiece lens 3 is inserted into a groove 4b on the other hand. The view finder is built in a lens-fitted photo film unit, a compact camera, an instant camera, and so forth.

The object lens 2 has a front of a flat surface 5 and a rear of a concave surface 6. The flat surface 5 is protruded on an object side. A flange 7 to be inserted into the lens holder 4 is formed around the object lens 2. Besides that, the object lens 2 is provided with a frame-shaped reflective portion 8 in a manner that surrounds the flat surface 5. The reflective portion 8 consists of micro corner cube prisms 9 that are integrally formed on the object lens 2. The respect micro corner cube prisms 9 have a triangular bottom. Adjacent two micro corner cube prisms 9 are positioned so that a side of the bottom surface gets in contact with. As a result, a line connecting each apex of the micro corner cube prism 9 becomes in zigzags. This reflective portion 8, together with the lens portion of the object lens 2, is made from plastics by moldings. As illustrated in FIG. 2 in detail, the micro corner cube prism 9 is the same shape as a tetrahedron which was cut from the cube 12 so as to include a corner P1 of a cube 12. The shape of the micro corner cube prism 9 is a triangular pyramid, having the apex of the corner P1 and a section of a bottom surface 9a. As is generally known, in the corner cube prism 9, incident light L1 from the bottom surface 9a of the triangular pyramid is reflected from three reflective surfaces 9b, 9c and 9d that cross at right angles each other and emitted out of the bottom surface 9a as light L2. The corner cube prism 9 assumes the so-called reflective return properties that the emitting light L2 is parallel to the incident light L1.

As shown in FIG.3, according to the micro corner cube prisms 9, the bottom surface 9a is connected with the lens portion, inclining the reflective surfaces 9b, 9c, and 9d. The micro corner cube prisms 9 are arranged, leaving no space between them. The bottom surface 9a of the micro corner cube prism 9 is an equilateral triangle, while the bottom surface of micro corner cube prisms 14 that are positioned at the corner of the reflective portion 8 is an isosceles triangle.

Figure 4:
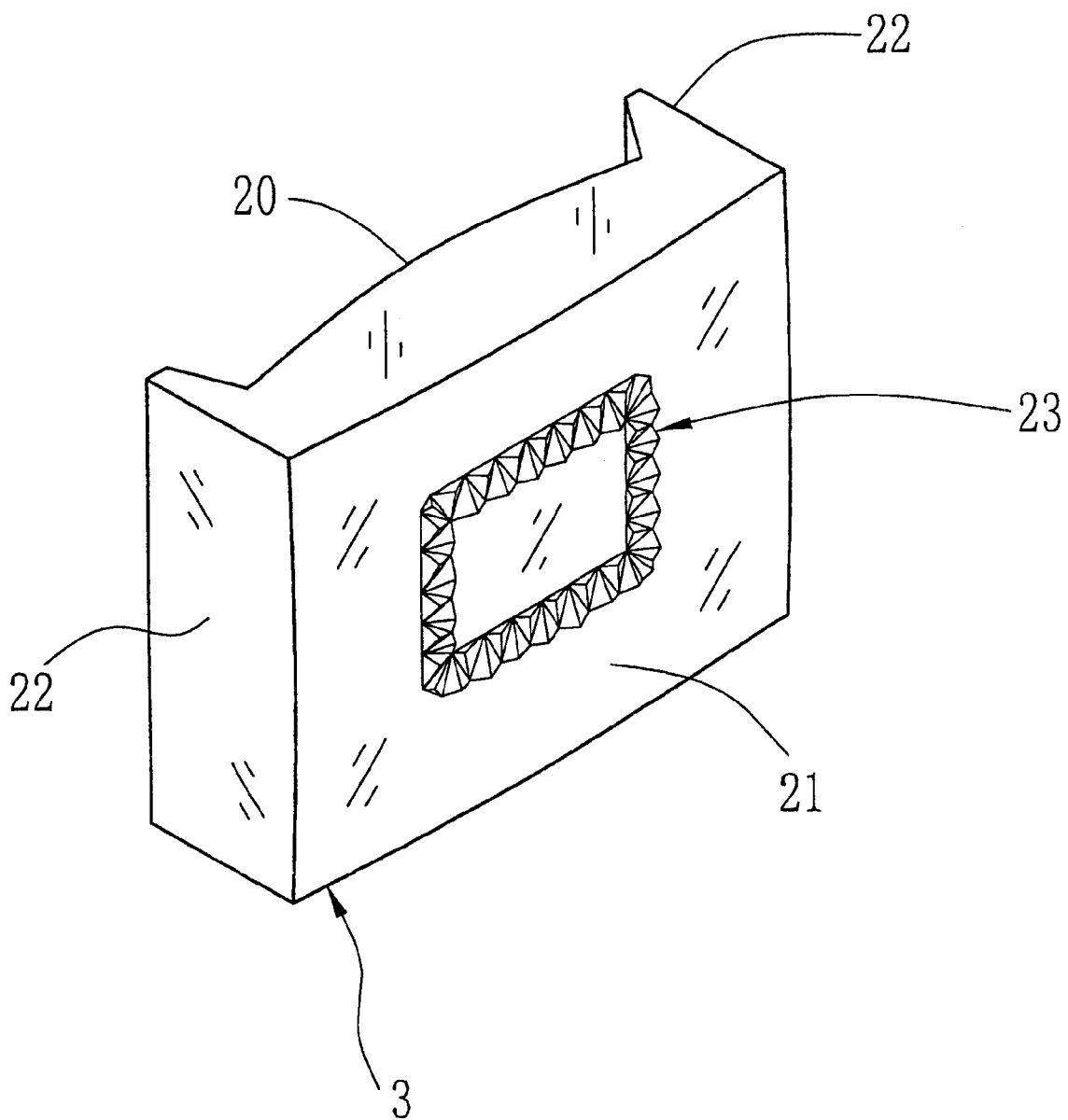
FIG. 4 is a perspective view of an eyepiece lens.

As for the eyepiece lens 3, as shown in FIG.4, the front is a convex surface 20 and the rear is a flat surface 21. A numeral 22 is a built-in portion for the lens holder 4. A frame-shaped reflective portion 23 is formed on the flat surface 21.This reflective portion 23 is made up of micro corner cube prisms like the reflective portion 8. It is preferable that the micro corner cube prism of the reflective portion 23 should be reduced its size so as not to lose its sharpness, which is caused by blurring of visual field of the finder and the like.

Figure 5:
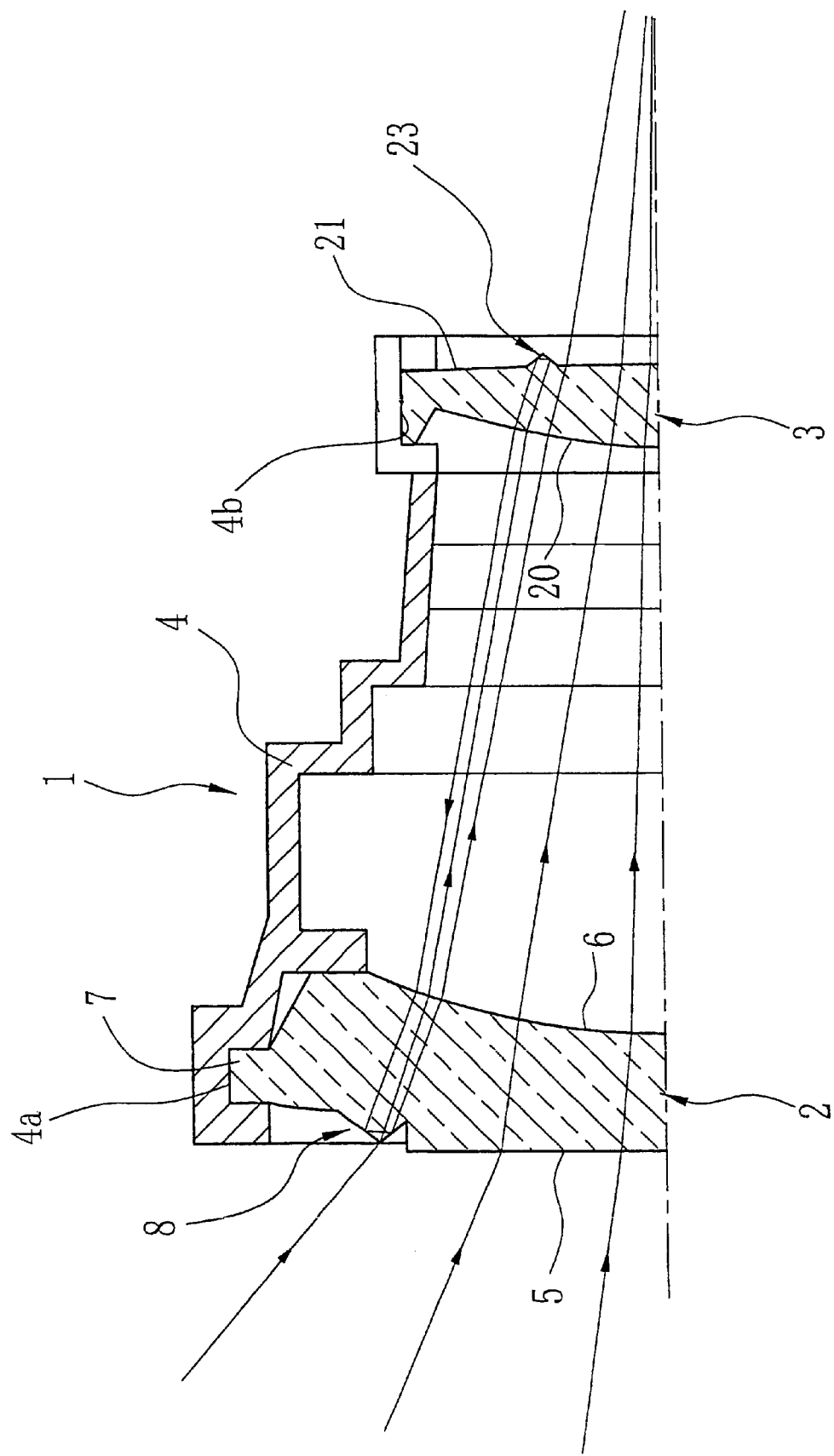
FIG. 5 is a sectional view of a view finder.

The action of the above embodiment is explained in view of the FIG. 5. Light from an object, passing through the object lens 2, is incident upon the eyepiece lens 3. Almost incident light through the eyepiece lens 3, arrive to an eye of a photographer. Light that has reached to the reflective portion 23 of the eyepiece lens 3 is reflected toward the object lens 2 by the micro corner cube prisms. The reflective light, passing through the light path that is practically parallel to the incident light to the reflective portion 23, returns to the object lens 2. The reflective light returns to the object lens 2 is reflected by the reflective portion 8, passing through the returning path parallel to the going path, is incident on the eyepiece lens 3 again. And then it reaches to the eye of the photographer by way of the eyepiece lens 3.

Figure 6:
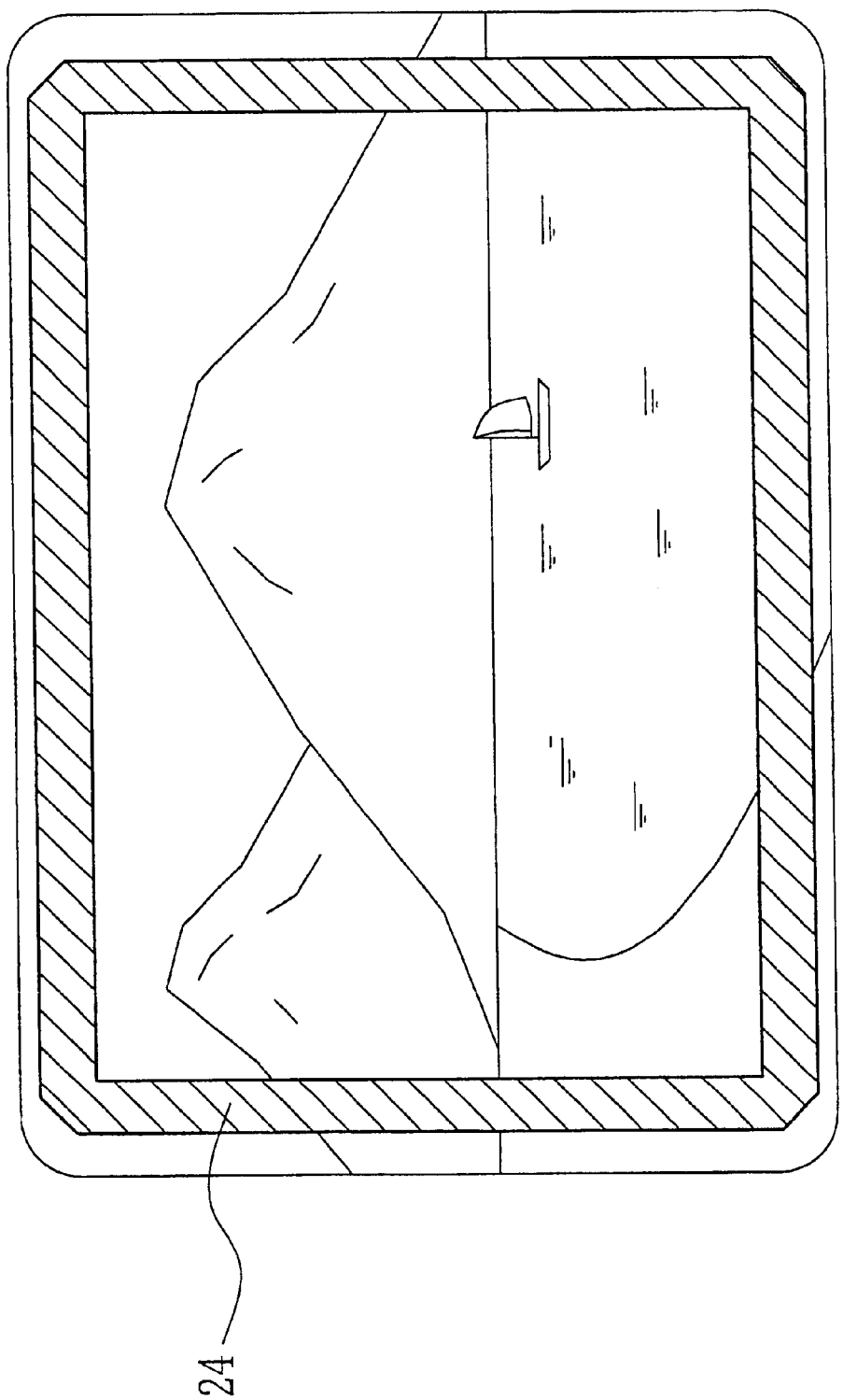
FIG. 6 is an explanatory view illustrating a visual field of a view finder.

In this way, a reflected image of the reflective portion 23 is observed as a virtual image resulted from the reflective action of the micro corner cube prism 9 of the reflective portion 8, as well as it is enlarged on the concave surface 6. As shown in the FIG.6, a rectangular finder field frame 24 according as the shape of the reflective portion 8 is observed overlapped with an object image within the visual field of the finder. Although the outline of the lens holder 4 is observed on the outside of the finder field frame 24, it does not work as a finder field frame, since the short distance from an eye fails to focus on an object, which seems blurred. In addition to that, even if an eye of a photographer is deviated from the optical axis, the finder field frame 24 does not become a striped pattern, for it is formed by the properties of reflective return of the corner cube prism 9.

According to the present invention, a mirror can be used instead of the reflective portion 23 of the eyepiece lens 3 as long as the corner cube prisms 9 are formed on the object lens 2. It is also possible to form a half-mirror on the whole one side of the eyepiece lens 3 for using it as reflective portion 23. If a reflecting mirror is formed on the outside of the corner cube prisms 9 (three inclined planes) by means of vapor deposition in case of using the half-mirror of large-size, it is possible to have effect of improving the brightness of the finder field frame.

Figure 7:
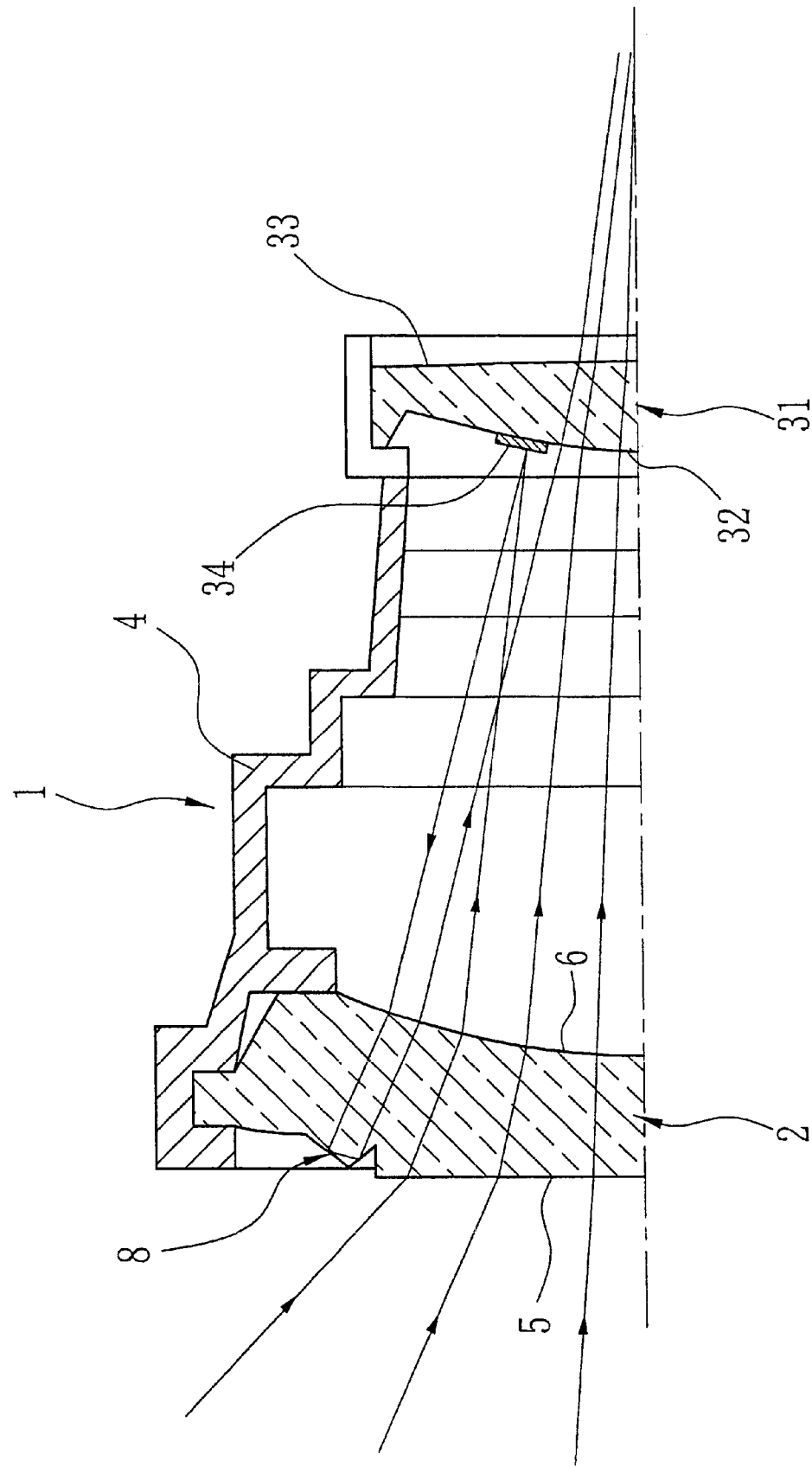
FIG. 7 is a sectional view of a view finder of another embodiment of the present invention.

FIG.7 illustrates an embodiment of a mirror that was evaporated on the eyepiece lens. The same numerals are given for the above-mentioned embodiment. As for the eyepiece lens 31, the front is a convex surface 32, meanwhile the rear is a flat surface 33. A mirror 34 on which metal frilling is deposited is formed on the convex surface 32.

Light incident on the mirror 34 is reflected towards the object lens 2. And it is reflected in parallel by the reflective portion 8, passing through the eyepiece lens 31. In case, a mirror 34 is formed on the eyepiece lens 31, a finder field frame without stripe pattern is observed in the view finder. It is also suitable that the mirror 34 is a half-mirror besides the whole-reflective mirror. Furthermore, it is possible to form the half-mirror on the whole rear of the eyepiece lens 31.

Figure 8:
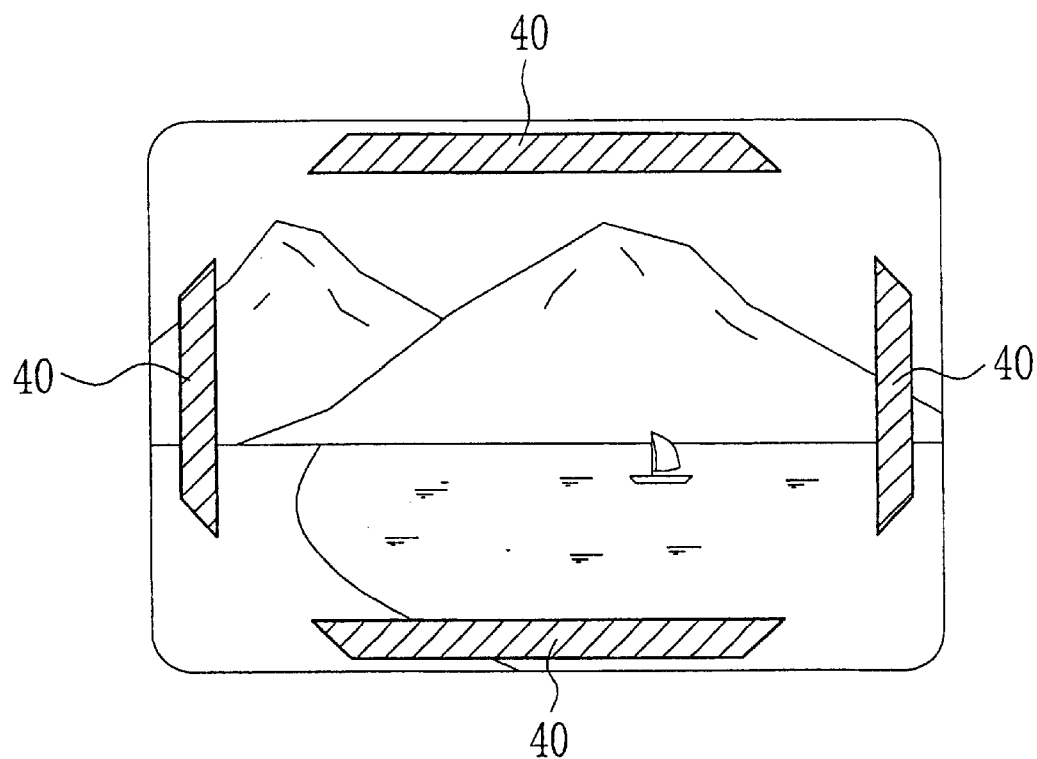
FIGS. 8 and 9 are explanatory views respectively illustrating the shapes of the finder field frames.
Figure 9:
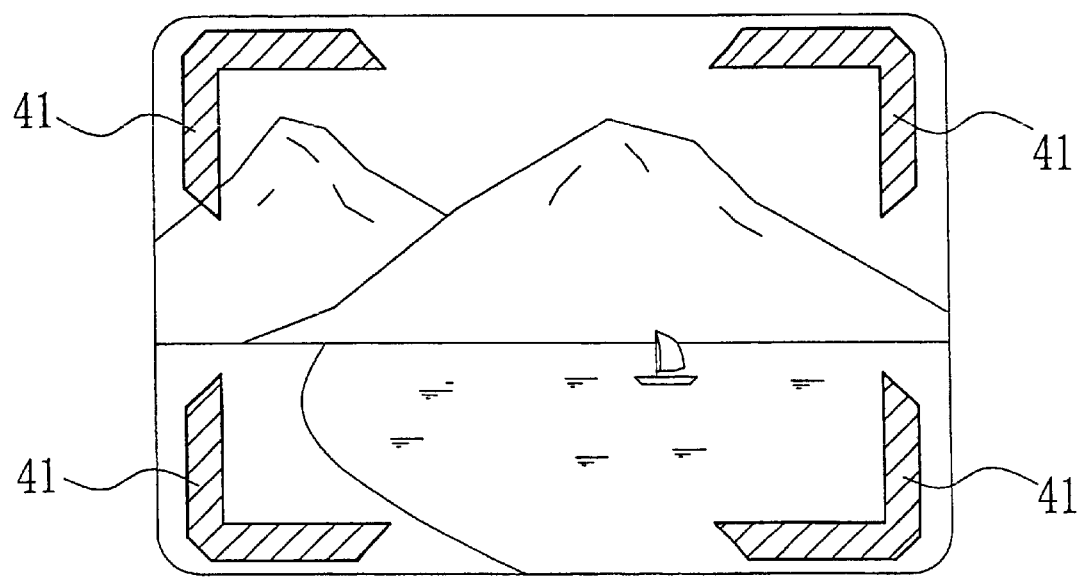

Although the finder field frame is a quadrilateral in the above embodiment, it is possible to display any shape by changing the shape of the reflective portion 8 of the object lens such as a finder field frame having four sides 40 without the four corners of the rectangle as shown in the FIG. 8, a finder field frame having only four corners 41 as shown in the FIG. 9 and so forth.

Moreover, corner cube prisms are arranged in a line in the above embodiment. However, arranging them in two or three lines helps clarity of the finder field frame. Besides that, the present invention can be applied to a finder which includes more than three lenses as well as a simple finder optical system comprising of an object lens and an eyepiece lens.

What is claimed is:

1. A finder having at least an object lens and an eyepiece lens comprising:
   a first reflective portion formed on said eyepiece lens, which reflects incident light towards said object lens; and
   a second reflective portion formed on said object lens, said second reflective portion reflecting light from said first reflective portion towards said eyepiece lens in order to show a finder field frame for indicating a range of photography, said second reflective portion comprising first corner cube prisms arranged according to a shape of said finder frame, each corner cube prism being a tetrahedron.

2. A view finder as claimed in claim 1, wherein said first corner cube prisms are integrally formed with said object lens.

3. A view finder as claimed in claim 2, wherein said first corner cube prisms are formed in front of said object lens.

4. A view finder as claimed in claim 3, wherein said finder field frame consists of a quadrilateral that is lacking four corners.

5. A view finder as claimed in claim 3, wherein said finder field frame consists of four corners of a quadrilateral.

6. A view finder as claimed in claim 3, wherein said first reflective portion comprises second corner cube prisms.

7. A view finder as claimed in claim 6, wherein said second corner cube prisms are integrally formed on a rear of said eyepiece lens.

8. A view finder as claimed in claim 3, wherein said first reflective portion is formed in front of said eyepiece lens.

9. A view finder as claimed in claim 8, wherein said first reflective portion is a mirror that was formed by vacuum evaporation.

10. The finder of claim 1, wherein each of a plurality of the corner cube prisms of the second reflective portion has three equal-sized isosceles faces and an equilateral base.

11. The finder of claim 10, wherein four of the corner cube prisms of the second reflective portion have three isosceles faces and an isosceles base.

12. The finder of claim 6, wherein each of a plurality of the corner cube prisms of the first and second reflective portions has three equal-sized isosceles faces and an equilateral base.

13. The finder of claim 12, wherein four of the corner cube prisms of each of the first and second reflective portions have three isosceles faces and an isosceles base.

14. The finder of claim 11, wherein the corner cube prisms of the second reflective portion are arranged so that two edges of each of the corner cube prism bases conjoin edges of the bases of two immediately adjacent said corner cube prisms.

15. The finder of claim 13, wherein the corner cube prisms of the first and second reflective portion are arranged so that two edges of each of the corner cube prism bases conjoin edges of the bases of two immediately adjacent said corner cube prisms.

16. The finder of claim 1, wherein the first corner cube prisms are arranged so that a first light ray falling on one of the first corner cube prisms having been reflected from the first reflective portion on the eyepiece lens will be reflected back toward the eyepiece lens along a path parallel to the first ray.

* * * * *